US010989630B2

(12) United States Patent
Diamond et al.

(10) Patent No.: US 10,989,630 B2
(45) Date of Patent: Apr. 27, 2021

(54) SAMPLING APPARATUS

(71) Applicant: Advanced Sampling Process Instruments Limited, Glasgow (GB)

(72) Inventors: Kenneth Diamond, East Kilbride (GB); Efren Dominguez Rodriguez, Ingenio (ES)

(73) Assignee: Advanced Sampling Process Instruments Ltd., Glasgow (GB)

( * ) Notice: Subject to any disclaimer, the term of this patent is extended or adjusted under 35 U.S.C. 154(b) by 421 days.

(21) Appl. No.: 16/151,081

(22) Filed: Oct. 3, 2018

(65) Prior Publication Data

US 2020/0110007 A1    Apr. 9, 2020

(51) Int. Cl.
*G01N 1/14* (2006.01)
(52) U.S. Cl.
CPC ...................................... *G01N 1/14* (2013.01)
(58) Field of Classification Search
CPC ........................................................ G01N 1/14
USPC ....................................................... 73/863.83
See application file for complete search history.

(56) References Cited

U.S. PATENT DOCUMENTS

| | | | | |
|---|---|---|---|---|
| 4,532,814 A * | 8/1985 | Lalin | ....................... | G05D 7/03 73/863.03 |
| 4,777,141 A * | 10/1988 | Calzi | ....................... | G01N 21/82 422/72 |
| 4,896,548 A * | 1/1990 | Lalin | ................... | F04B 11/0033 73/863.03 |
| 4,919,000 A * | 4/1990 | Long | ....................... | G01N 1/20 73/863.91 |
| RE35,824 E * | 6/1998 | Welker | ...................... | G01N 1/14 73/863.83 |
| 6,038,934 A * | 3/2000 | Peterson | ................... | G01N 1/14 73/863.86 |
| 6,148,679 A * | 11/2000 | Mann | ....................... | G01N 1/20 73/863.51 |
| 7,988,916 B2 * | 8/2011 | Bremauer | ........... | B01F 15/0237 422/75 |

FOREIGN PATENT DOCUMENTS

| | | |
|---|---|---|
| DE | 003640939 A1 | 6/1988 |
| GB | 1492956 A | 11/1977 |
| GB | 2549197 A | 10/2017 |
| GB | 2549197 B | 5/2018 |
| RU | 002303772 C2 | 7/2007 |

* cited by examiner

*Primary Examiner* — Nathaniel T Woodward
(74) *Attorney, Agent, or Firm* — Workman Nydegger

(57) ABSTRACT

An apparatus for obtaining samples from a process, and which can be located in the process, which comprises a gate which reciprocates between a first position and a second position to fill and empty a sample chamber via corresponding inlets and outlets. The gate may pivot within the chamber about a longitudinal axis through the chamber, and a dam prevents fluid flow directly between the inlets and outlets. The inlets may provide outlets, and vice versa, depending on the direction of movement of the gate. Means such as pumps may be provided to agitate the fluid samples obtained by the apparatus, and sensors mounted in the sample chamber (for example on the gate or on the dam) can perform measurements on the samples. Wipers may be provided on the gate to assist in the ingress and egress of samples into and out of the sample chamber. It is also possible to inoculate the fluid samples within the sample chamber.

20 Claims, 5 Drawing Sheets

SAMPLING APPARATUS

The present invention relates to the field of sampling apparatus such as may be employed to retrieve samples from a process. More specifically, the present invention concerns improvements to sampling apparatus that provides increase reliability and robustness thus enabling extended periods of service without operator intervention or remedial action.

BACKGROUND TO THE INVENTION

In many processes, it is required to analyse a sample (e.g. liquid or other fluid) from within the process while maintaining a stable and controlled environment. Additionally, such processes may involve liquids with suspended solids, which are also required to be analysed, placing additional burden on a sampling system. Since the analysis should be performed on a sample taken from within the process the sampling system must be reliable and robust to provide extended periods of service without any intervention by the operator or remedial action.

Known systems for retrieving samples from a process include sample grabbing mechanisms and instruments which do not tend to perform well in harsh and demanding environments. Accordingly, there are problems with such systems which may be compromised in fit for purpose functionality and longevity.

One particular sampling apparatus which is known to the applicant involves a complex arrangement in which a piston and a shell are moveable relative to one another and independently actuated to selectively open, seal and evacuate a sample chamber. Such an apparatus is relatively complex and therefore may be more prone to failure, and in any case can be costly to produce and therefore unsuitable for widespread deployment.

There is presently a need for a sampling system which can be permanently inserted into a process and immersed to any depth in the process to capture samples as may be appropriate to the analysis. Furthermore, there is a need to reduce the risks of such a sampling system interfering with or being affected by the external environment.

It is also desirable to eliminate the need for external moving parts as may, for example, be required to grab samples, the control of those parts, and the removal of the inherent reliability issues of multiple moving parts.

It would be advantageous to be able to provide fresh samples for continuous or differing analysis without the necessity to manage or manipulate the sample, which might thereby affect the intrinsic nature of the sample. That being said it would also be advantageous to handle a captured sample so that it can be analysed under different conditions than those that exist in the native environment, allowing the user to predict system performance.

It is an object of at least one aspect of the present invention to obviate and/or mitigate one or more disadvantages of known/prior apparatus such as described above.

Furthermore, it is an object of at least one embodiment of the present invention to provide an apparatus that provides one or more of the above-mentioned desired features and/or advantages.

Further aims and objects of the invention will become apparent from reading the following description.

SUMMARY OF THE INVENTION

According to a first aspect of the invention, there is provided an apparatus for obtaining samples from a process, the apparatus comprising a sample chamber comprising at least one inlet and at least one outlet, a dam positioned in the chamber between the at least one inlet and the at least one outlet, and a gate moveable within the chamber between a first position and a second position to eject a first sample from the chamber via the at least one outlet and simultaneously draw a second sample into the chamber via the at least one inlet.

Advantageously, the dam prevents fluid communication between the at least one inlet and the at least one outlet.

Preferably, the at least one inlet is located proximal a first side of the dam and the at least one outlet is located proximal a second, opposite side of the dam.

Preferably, the sample chamber comprises a housing arranged, adapted or otherwise configured for location in the process.

Preferably, the at least one inlet comprises a first opening on an outer surface of the housing and a second opening on an inner surface of the housing such that a sample is drawn into the sample chamber directly from the process.

Preferably, the at least one outlet comprises a first opening on an outer surface of the housing and a second opening on an inner surface of the housing such that a sample is ejected from the sample chamber directly into the process.

Preferably, the first position of the gate is proximal a first side of the dam and the second position of the gate is proximal a second, opposite side of the dam. Optionally, the gate is configured to abut the dam in the first and/or second position. A first face of the gate, corresponding to the first side of the dam, may be shaped to match the first side of the dam.

Preferably, the gate is configured to pivot about a longitudinal axis through the chamber.

Preferably, the apparatus further comprises at least one sensor to enable a measurement to be performed within the sample chamber.

Optionally, at least one sensor is located on the gate. At least one sensor may be located on one or both faces of the gate.

Alternatively, or additionally, at least one sensor is located on the dam.

The at least one sensor may be selected from the group comprising oxygen sensors, temperature sensors, chemical sensors, pH sensors, sludge settlement sensors, suspended solids sensors, turbidity sensors, density sensors, conductivity sensors, salinity sensors and contact sensors.

Optionally, the apparatus further comprises means to agitate a sample within the sample chamber.

Optionally, the means to agitate a sample comprises one or more pumps. The one or more pumps may be located on or in the dam, and may be micro-pumps, or one or more outlets may be provided on the dam in fluid communication with one or more pumps or micro-pumps.

Optionally, the apparatus further comprises means to inoculate a sample within the sample chamber. The means may comprise one or more outlets on the dam in fluid communication with an external source of inoculant. Preferably, outlets are provided on both faces of the dam.

Preferably, the gate is moveable between the second position and the first position to eject a sample from the chamber via the at least one inlet (which becomes an outlet) and simultaneously draws another sample into the chamber via the at least one outlet (which becomes an inlet).

Preferably, reciprocation of the gate between the first position and the second position causes a plurality of samples to be drawn into the chamber and subsequently ejected.

Preferably, the apparatus comprises a plurality of inlets and a plurality of outlets. Preferably, the plurality of inlets and outlets are distributed vertically in the sample chamber. They may be distributed evenly between the top and the bottom of the sample chamber.

Preferably, the gate comprises one or more wipers to assist in drawing samples into the sample chamber and/or ejecting samples from the sample chamber. The wiper may provide a seal between the gate and the inner surface of the sample chamber.

Preferably, the sample chamber is substantially cylindrical. Preferably, a lower portion of the sample chamber is substantially frusto-conical.

The gate may be hollow. The dam may be hollow. The internal volumes of the gate and/or the dam may house one or more sensors, micro-pumps and/or conduits for the delivery of inoculant to the sample chamber.

The apparatus may comprise a motor to move the gate. The motor may be operatively connected to the dam via one or more gears. The motor may be housed within a top chamber of the apparatus. The top chamber may further house a controller.

Optionally, the apparatus is, at least in part, hermetically sealed. Preferably, the top chamber of the apparatus is hermetically sealed. Alternatively, one or more components within the top chamber of the apparatus are hermetically sealed.

Preferably, the apparatus comprises communications means. The communications means may comprise one or more conduits for connection to a controller. Alternatively, the communications means may be wireless, and may comprise Wi-Fi, Bluetooth, NFC or the like.

The apparatus may comprise a mounting post. The mounting post may be of a predetermined length corresponding to a desired depth to which the apparatus is to be inserted in the process. The mounting post may be hollow so as to accommodate one or more conduits.

In a preferred embodiment of the first aspect of the invention, the gate reciprocates between a first position and a second position to fill and empty the sample chamber via a plurality of inlets and outlets, wherein the gate pivots within the sample chamber about a longitudinal axis through the chamber, wherein the dam prevents fluid flow directly between the inlets and outlets, and wherein sensors mounted on the gate and/or on the dam enable measurements to be performed on samples within the sample chamber.

According to a second aspect of the invention there is provided a method of obtaining a sample from a process comprising providing an apparatus according to the first aspect within the process, and moving the gate between the first position and the second position or vice versa.

Embodiments of the second aspect of the invention may comprise features corresponding to the preferred or optional features of the first aspect of the invention or vice versa.

According to a third aspect of the invention there is provided a monitoring system comprising an apparatus according to the first aspect and a controller in communication with the apparatus.

Embodiments of the third aspect of the invention may comprise features corresponding to the preferred or optional features of the first or second aspects of the invention or vice versa.

According to a fourth aspect of the invention there is provided a method of monitoring a process comprising providing an apparatus according to the first aspect within the process, obtaining one or more samples from the process by moving the gate between the first position and the second position, and performing one or more measurements on the one or more samples within the sample chamber.

Optionally, the method comprises agitating the one or more samples within the sample chamber.

Optionally, the method comprises inoculating the one or more samples within the sample chamber.

Optionally, the method comprises altering the process responsive to the one or more measurements.

Embodiments of the fourth aspect of the invention may comprise features corresponding to the preferred or optional features of the first, second or third aspects of the invention or vice versa.

According to further aspects of the invention, there is provided an apparatus and a process substantially as herein described with reference to the appended drawings.

BRIEF DESCRIPTION OF THE DRAWINGS

There will now be described, by way of example only, embodiments of aspects of the invention with reference to the drawings (like reference numerals being used to denote like features), of which.

DETAILED DESCRIPTION OF PREFERRED EMBODIMENTS

As intimated in the background to the invention above, the invention (in at least one aspect) is an apparatus for obtaining samples from a process. Generally, these may be fluid samples from any one of a vast array of processes in which the invention might be deployed (some non-exhaustive examples of which are mentioned below), and in particular may be liquid samples or samples containing mixtures of liquids, gases and/or solids (which may or may not be in suspension).

Above, and below, the invention is defined and described (respectively) in terms of at least one inlet and at least one outlet. However, it will be recognised that while in one sense the at least one inlet facilitates a sample (be it liquid or otherwise) being drawn into the sample chamber, in another sense it may facilitate a sample being ejected from the sample chamber in which case it is effectively at least one outlet. The at least one inlet and at least one outlet may therefore be interchangeable, and may alternatively be referred to as first and second ports.

Figure 1:
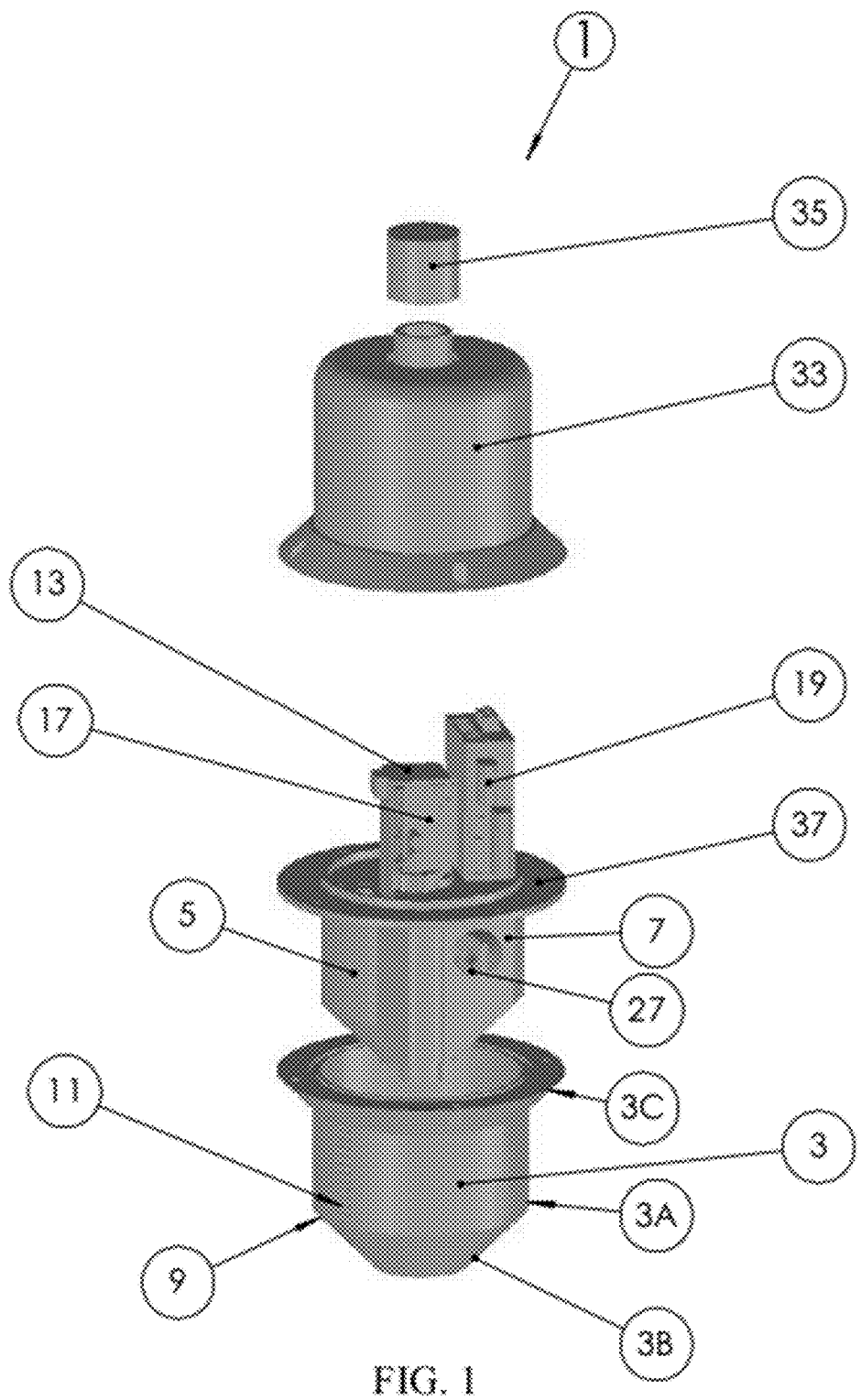
FIG. 1 illustrates in exploded view an apparatus for obtaining samples from a process.
Figure 2:
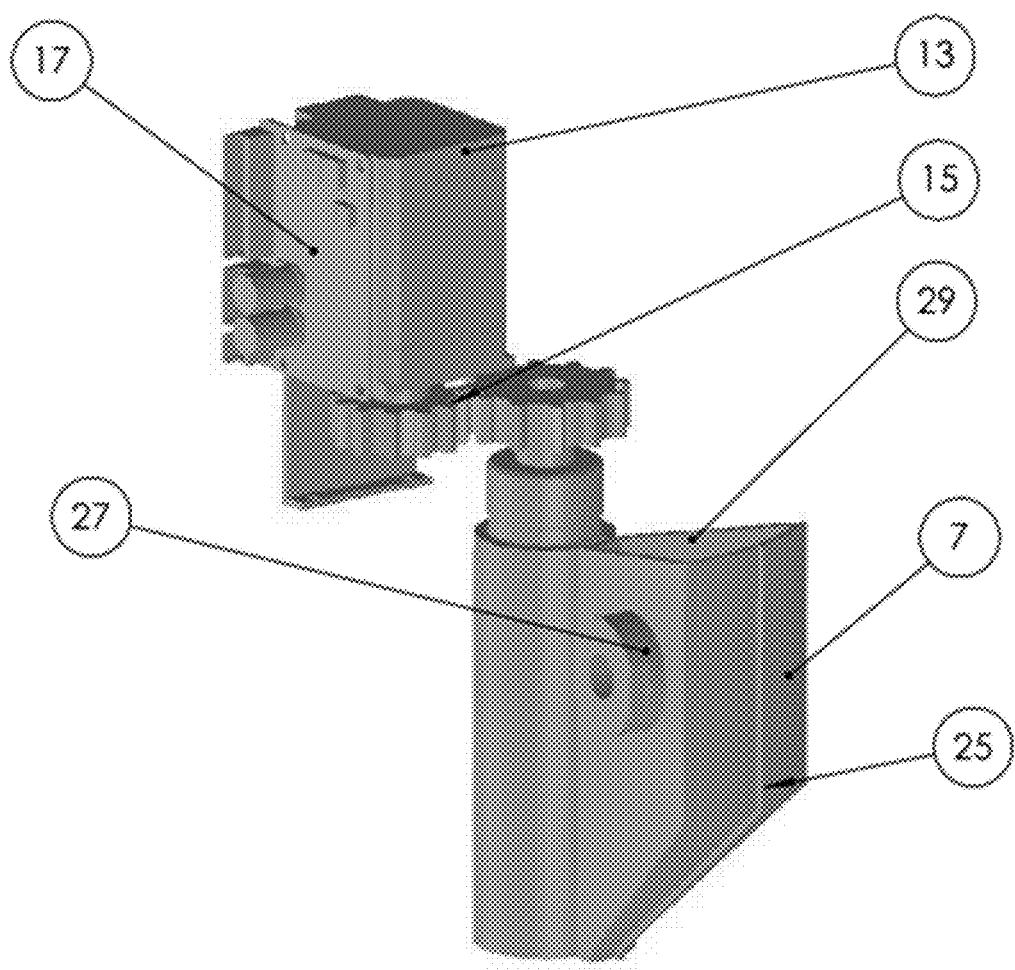
FIG. 2 illustrates in exploded view the gate assembly of the apparatus shown in FIG. 1.
Figure 3:
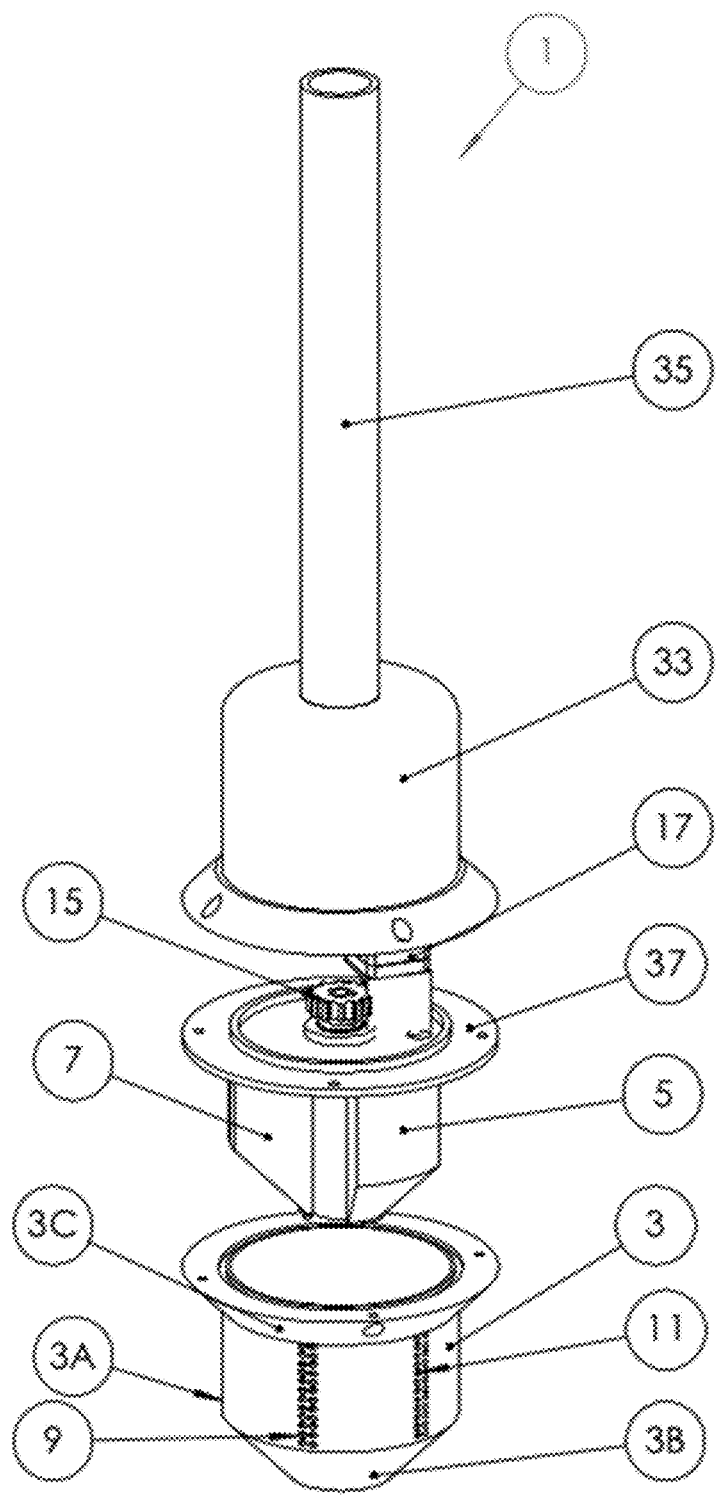
FIG. 3 illustrates an alternative exploded view of the apparatus shown in FIG. 1.
Figure 4:
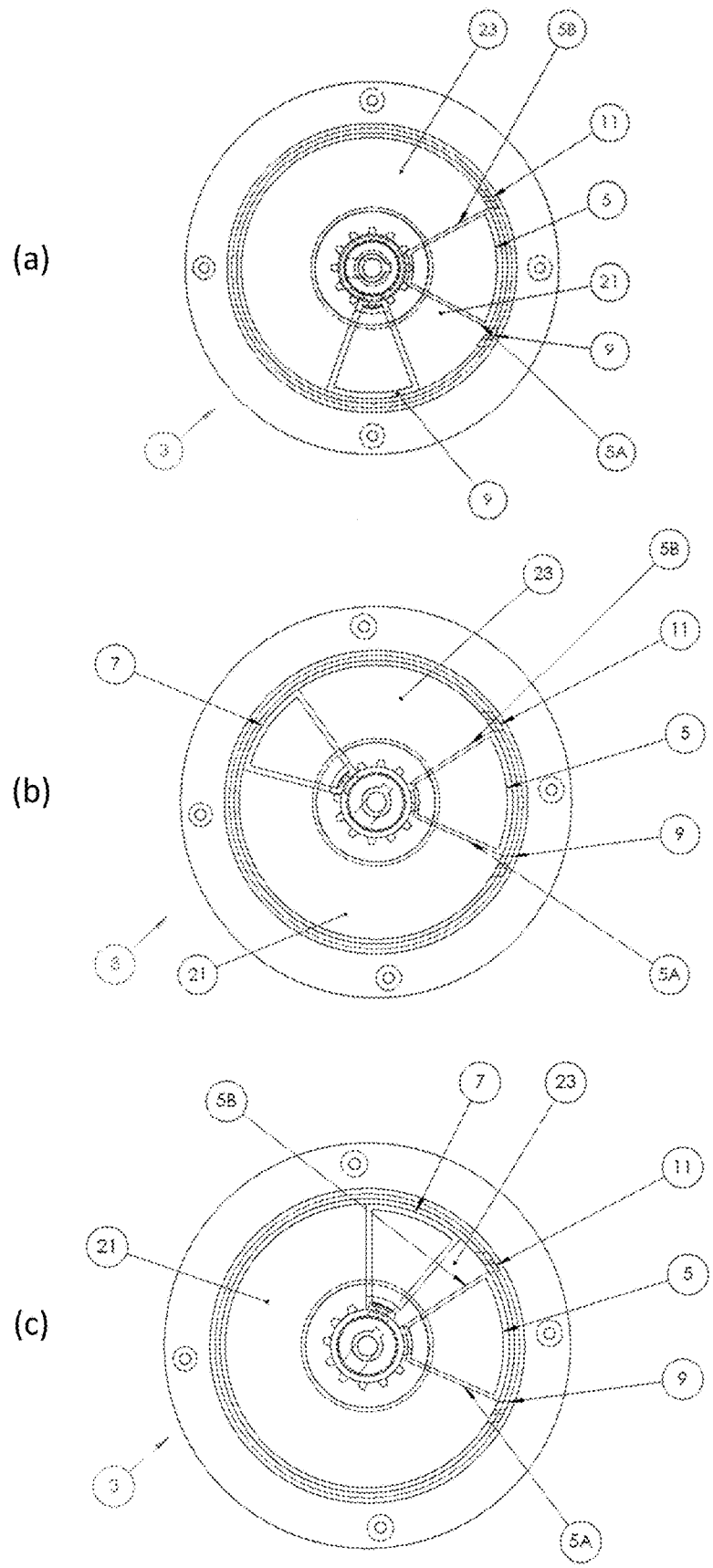
FIG. 4 is a schematic representation of the movement of the gate within the sample chamber of the apparatus shown in FIG. 1 in a first (clockwise) direction.
Figure 5:
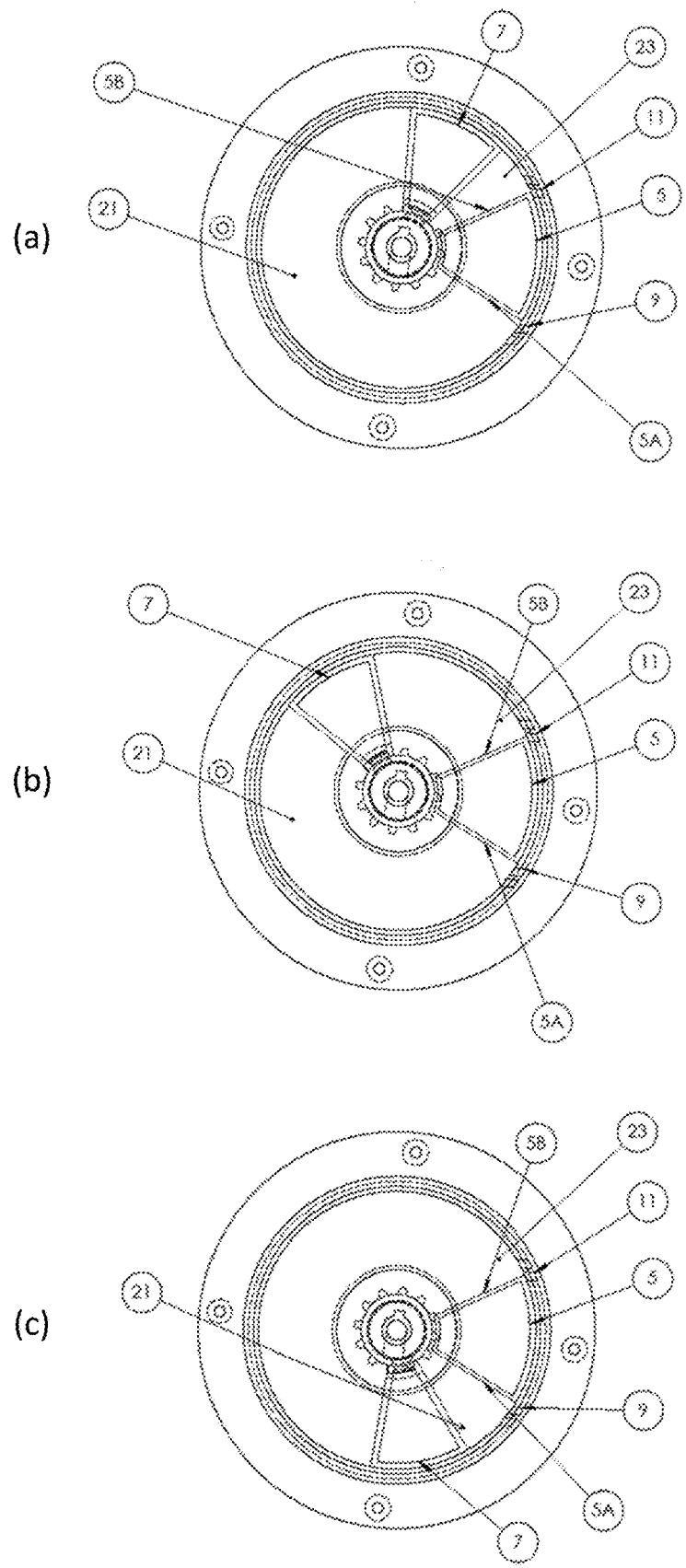
FIG. 5 is a schematic representation of the movement of the gate in a second (anti-clockwise) direction.

An embodiment of the present invention is illustrated in FIGS. 1 to 3 which overcomes many perceived problems with the prior art, and FIGS. 4 and 5 illustrate how samples are drawn in and subsequently ejected during operation. A sampling apparatus 1 comprises a sample chamber 3 into which a sample is drawn for subsequent measurement. The sample chamber 3 can be seen to comprise a generally cylindrical shape, with a frusto-conical base.

Any shape of the sample chamber 3 can be chosen; this particular shape may promote settlement of suspended solids and may therefore be particularly suited for measurements in the settled mode for supernatant analysis or determination of the interface layer position and depth (by appropriate sensors, see below).

Within the sample chamber is a dam 5, which is held in position against an inner surface of the sample chamber 3. One purpose of the dam is to prevent fluid communication between inlets 9 and outlets 11, as will be clear from the description of the operation of the sampling apparatus 1 below.

Note that while the dam is described as being a separate and removeable component (with respect to the sample chamber), it is foreseen that the dam may alternatively be fixed to the inner surface of the sample chamber or may indeed be integrally formed with the sample chamber.

The inlets 9 and outlets 11 enable a sample to be drawn into and ejected from the sample chamber 3, respectively. As noted above and below, the inlets 9 may serve as outlets and the outlets 11 may serve as inlets depending on the mode in which the sampling apparatus is being operated. The inlets 9 and outlets 11 are shown as being present only on the cylindrical section 3A of the sample chamber, however the inlets 9 and outlets 11 may extend not only down the frusto-conical section 3B but also up the bevelled section 3C such that a sample is drawn into the sample chamber 3 through inlets 9 (or outlets 11) which extend the full height of the sample chamber 3.

Furthermore, although shown in two vertical columns, the inlets 9 and outlets 11 may be provided in a single column or more than two columns. It is also envisaged that a single inlet and a single outlet could be provided which each takes the form of an elongate vertical slot, which may extend substantially the full height of the sample chamber. In any case, the size (e.g. diameter) of the one or more inlets and outlets, is preferably selected to accommodate the sample which it is desired to obtain from the process. To allow ingress (and egress) of particulate material, for example, the one or more inlets (and outlets) may be larger than would be required for a liquid-only sample. The one or more inlets (and outlets) may also or alternatively serve as a filter to prevent material larger than the inlet (and outlet) diameters from entering the sample chamber.

To draw samples into the sample chamber 3, the apparatus comprises a gate 7 which pivots about a longitudinal axis extending through the sample chamber 3. The gate 7 is reciprocated within the sample chamber 3 by motor 13 via a gear assembly 15. The motor 13, and hence movement of the gate 7, is controlled by gate control electronics 17 which may in turn be controlled by commands or signals received from apparatus control electronics 19 or an external controller (not shown).

FIGS. 4 and 5 illustrate how the gate 7 draws a sample into the chamber 3 while simultaneously ejecting a previous sample from the chamber 3. FIGS. 4(a)-(c) show the movement of the gate 7 in a clockwise direction within the chamber 3. Notably, the inlets 9 and outlets 11 are located proximal to the dam 5, and the dam 5 prevents fluid communication between the inlets 9 and outlets 11. Starting from a position where the gate 7 abuts a first face 5A of the dam 5 (which also blocks the inlets 9) the gate 7 can be seen to rotate about the above-mentioned longitudinal axis. This draws a sample into the space 21 behind the gate 7 via the inlets 9 as the gate 7 progresses, while ejecting a previous sample from the space 23 in front of the gate 7 via the outlets 11. The gate 7 continues to rotate within the chamber 3 until it abuts a second face 5B of the dam 5, at which point the previous sample has been ejected from the chamber 3. In this position the outlets 11 will now be blocked.

Note that the gate 7 is provided with a wiper 25 which provides a seal between the gate 7 and the inner surface of the sample chamber 3 which prevents samples from bypassing the gate 7 and also assists in removing deposits from the inner surface of the sample chamber 3 and ejection of samples.

While the wiper 25 is shown centrally on an outer face of the gate in FIG. 2, alternatively there may be provided several wipers, for example one wiper at each edge of the outer face of the gate.

FIGS. 5(a)-(c) show the subsequent movement of the gate 7 in an anti-clockwise direction within the chamber 3. Starting from a position where the gate 7 abuts the second face 5B of the dam 5 (which also blocks the outlets 11) the gate 7 can be seen to again rotate about the above-mentioned longitudinal axis, this time in the opposite direction to that described above. This draws a sample into the space 23 behind the gate 7 via the outlets 11 (which now function as inlets) as the gate 7 progresses, while ejecting the sample obtained as above from the space 21 in front of the gate 7 via the inlets 9 (which now function as outlets). The gate 7 continues to rotate within the chamber 3 until it abuts the first face 5A of the dam 5, at which point the sample obtained as above has been ejected from the chamber 3. In this position the inlets 9 will now (again) be blocked.

Reciprocation of the gate 7 back and forward between first and second positions where it abuts first and second faces 5A,5B of the dam 5, provides a mechanism for repeatably and repeatedly drawing samples into the sample chamber 3 and ejecting samples from the sample chamber 3 in an effective and an efficient manner.

The gate 7 is provided with a sensor 27 on a sample facing surface to enable measurements to be performed on the sample to which the sensor 27 is exposed. One sensor 27 is shown but in practice several sensors may be provided, for example at least one on each side of the gate to enable measurements to be performed on each side of the gate and therefore on each sample regardless of the position of the gate 7 (i.e. whether the sample is in space 21 as per FIG. 4 or space 23 as per FIG. 5). It is foreseen that several sensors may be provided on each side of the gate 7.

The gate 7 is hollow and the internal volume 29 of the gate 7 provides access and/or space for sensor electronics or at least conduits to interface the sensors with electronics and/or controllers housed elsewhere in the sampling apparatus 1 (for example in the top housing, see below).

The invention is not limited to any particular kind of sensor; in fact one of the key benefits of the arrangement disclosed herein is that any kind of sensor may be deployed within the sample chamber. Furthermore, the relatively simple arrangement may enable quick and easy removal and replacement of sensors, whether for repair purposes or to change the type of measurement being performed. Examples of sensors which might be employed include oxygen sensors (for example to measure dissolved oxygen in the sample), temperature sensors, chemical sensors (for example to measure the presence of potassium or ammonium), pH sensors, sludge settlement sensors, suspended solids sensors, turbidity sensors, density sensors, conductivity sensors and salinity sensors.

A contact sensor might also be employed to detect when the gate abuts the dam, at which point the motor driving the dam can be automatically stopped.

The sensor 27 discussed above is shown as projecting from the gate 7, and in such an arrangement it is advantageous that the dam 5 comprises a corresponding recess which receives the sensor 27 when the gate 7 abuts the dam 5. This may facilitate cleaning of the sensor as well. Of course the sensor may be flush with the gate in which case no such recess is required. In an alternative embodiment, not shown, sensors are instead (or may additionally be) located on the dam, similarly on sample facing surfaces to enable measurements on samples in spaces 21 and 23. This may also simplify control of and/or communication with the sensors although it is considered that locating the sensors on the gate—and therefore not in constant proximity to the inlets and outlets—will avoid disturbance or leaching and reduce the risk of interference.

In any case, in the embodiment described above and shown in the appended Figures, the dam 5 (like the gate 7) is also hollow thus providing an internal volume 31 which also provides access and/or space for electronics or at least conduits to interface components on or in the dam with electronics and/or controllers housed elsewhere in the sampling apparatus 1 (again for example in the top housing, see below).

By way of example, the dam 5 may be provided with one or more pumps to agitate a captured sample. Such agitation may be used to prevent settlement or to assist in ejection of the sample. Alternatively, or additionally, the dam may be provided with one or more pumps to allow for inoculation of a captured sample with gaseous and/or liquid inoculants. The internal volume 31 will enable such pumps and/or sources of inoculant to be located within the dam itself. However, it is foreseen that the internal volume might simply accommodate conduits which connect pumps located elsewhere in the sampling apparatus 1 (or indeed external to the sampling apparatus) to outlets on sample facing surfaces of the dam.

As referred to above, the sampling apparatus 1 comprises a top housing 33 which defines an internal volume within which such components as the motor 13, gear assembly 15, gate control electronics 17 and apparatus control electronics 19 are located. The top housing 33 may also house pumps and/or sources of inoculant which communicate with outlets in the dam 5, or accommodate conduits which originate externally to the sampling apparatus, for example external pumps or external sources of inoculant.

The top housing 33 is joined to the sample chamber 3 by divider plate 37 so as to provide a self-contained sampling apparatus. The divider plate 37 separates the sample chamber 3 from the control electronics 17, 19 and motor 13 and gate assembly 15 so as to prevent interference with an obtained sample (or indeed the process). In this embodiment, the top housing 33 and divider plate 37 are hermetically sealed. In this embodiment the dam 5 is fixed to the divider plate, although in an alternative embodiment it may be integrally formed with the divider plate.

The top housing 33 is attached to a post 35 which enables the sampling apparatus 1 to be mounted within a process. Selection of an appropriate length of post 35 enables the apparatus 1 to be submerged to a predetermined or desired depth within the process, and the hermetic seal described above means that the apparatus 1 can be left in situ indefinitely. One of the advantages of immersing the apparatus is the removal of the need for trace heating or cooling for the electronics (and other components) due to the extremes of summer or winter conditions since it is anticipated that the process may provide acceptable environmental conditions within the operating restrictions of the apparatus.

The post is hollow to enable communication of data to and/or control of the apparatus by an external controller via one or more conduits (not shown). Alternatively the apparatus may communicate with an external controller using wireless communication protocols such as Bluetooth, Wi-Fi, NFC or the like. The hollow post may enable delivery of inoculants to outlets on the dam from an external source.

In combination with a suitable controller, the apparatus may form part of a process monitoring system. Furthermore, the apparatus may be employed to monitor a process by obtaining samples from the process and performing or enabling measurements on those samples. The process may be altered responsive to the measurements made by the apparatus, thus enabling improved performance.

Examples of processes in which the apparatus (or a monitoring system including the apparatus) may be employed include slurry monitoring, clean water, wastewater treatment, sugar analysis and chemical processing, as discussed briefly below.

Slurries are often required to be analysed for a variety of chemicals however in existing systems the issues are one of maintaining a static sample and cleaning of the sensors as well as protecting sensors from abrasion when no analysis is required. The apparatus may provide a suitable capture mechanism by enlargement of the inlets and outlets and potentially allow multiple analyses from sensors housed in the gate and/or dam. Provision of micro-pumps in, say, the dam may facilitate cleaning for example by liquid solution or by air cleaning.

Clean water requires analysis of a range of chemicals and pathological bodies where a static sample is required that the apparatus can provide, and analysis of turbidity can be carried alternately in what is effectively two sample chambers.

In wastewater treatment, the bacteria used for the biological breakdown of organic carbons requires analysis of a number of characteristics. The apparatus may provide a contained sample for sludge settlement and turbidity analysis. Similarly containment of a bacterial sample allows analysis of the condition of the biomass through analysis of its oxygen uptake consumption.

The analysis of Brix, that is, the sugar density within the liquid process of sugar is required to ensure the quality of the manufacturing of differing varieties of sugar. The issue with existing arrangements is one of cleansing and protection of the measuring sensors and any optical elements. The apparatus is able to provide application appropriate mounting and cleaning by modification of the inlets and outlets, sensor mounting on the gate and/or dam and optionally cleansing from micro-pumps in the dam.

In chemical processing, where at depth measurements and/or capture of a sample from turbulent conditions is necessary then the apparatus can be deployed at depth and may also accommodate the mounting of multiple sensors. Provision of micro-pumps in the dam can provide either an inoculation dosing system and cleaning, and the interface between the dam and the gate can provide protection when analysis is not required.

In summary, any systems that process or use liquids require the ability to analyse a sample of the liquid within the process and to provide a stable and controlled environment. Additionally, such systems may contain liquids with suspended solids, which are also required to be analysed. Since it is desirable for the analysis to be conducted from within the process, a sampling system must be reliable and robust to provide extended periods of service without any intervention by the operator or remedial action. The present invention enables and facilitates such a reliable and robust sampling system.

The operating environment for the system may be harsh and demanding such that complex and sample grabbing mechanisms and instruments are compromised in fit for purpose functionality and longevity. The apparatus overcomes these issues by minimising the moving parts used in the design and by eliminating any sample grabbing or protrusions into the liquid management process. This is achieved by utilising an internal damming technique that moves liquid into and out of a sample chamber and provides a continuous sampling cycle by the reciprocating use of that sample chamber.

Whilst a captured liquid (for example) sample is contained within the sample chamber it may be allowed to settle or may be circulated and/or inoculated with (for example) one or more gases and/or liquids. The apparatus may provide a mounting system to allow sensors of varying types to be housed to analyse the managed and controlled liquid to provide stable conditions so as to allow the analysis to be completed. The apparatus may be controlled via a control PCB or the like which provides the user with an interface to interact in a desired way, for example to their own designs, or to a specific computer or third party control system.

The apparatus may be permanently inserted into a process and may sealed so that it can be immersed to any depth to capture samples as appropriate to the analysis. The capture and control of the sample remaining within the sample chamber reduces the risks of interfering or being affected by the external environment.

Internalising the capture and control of the sample removes the necessity for moving parts required to grab samples, the control of those parts, and the removal of the inherent reliability issues of multiple moving parts.

The reciprocating sampling allows for the provision of fresh samples for continuous or differing analysis without the necessity to manage or manipulate the sample, thereby affecting the intrinsic nature of the sample.

The sample ingress/egress technique may ensure that extraneous elements in the system liquors are removed from the sample, that interference from the external environment is minimised and the flow of the samples acts as a simple and effective cleaning system.

The ingress/egress system can be modified to cater for a range of mixed liquor suspended solids specific flows.

The sample chamber itself may be designed to promote settle-ability of suspended solids where the condition of an appropriate sample is to be analysed in settled mode for supernatant analysis or determination of the interface layer position and depth.

The apparatus also offers the ability to handle the captured sample so that it can be analysed under different conditions than those that exist in the native environment, allowing the user to predict system performance. This function may be achieved by an inoculation feature that allows gases or liquids to be injected into the sample from an external source.

The damming techniques used within the apparatus provide for multiple flexible mounting positions for sensors to allow wide and varied use of the apparatus. For example, a number of sensors can be mounted on the gate and/or on the dam as discussed above enabling multiple measurements and measurement types to be realised.

The invention provides an apparatus for obtaining samples from a process, and which can be located in the process, which comprises a gate which reciprocates between a first position and a second position to fill and empty a sample chamber via corresponding inlets and outlets. The gate may pivot within the chamber about a longitudinal axis through the chamber, and a dam prevents fluid flow directly between the inlets and outlets. The inlets may provide outlets, and vice versa, depending on the direction of movement of the gate. Means such as pumps may be provided to agitate the fluid samples obtained by the apparatus, and sensors mounted in the sample chamber (for example on the gate or on the dam) can perform measurements on the samples. Wipers may be provided on the gate to assist in the ingress and egress of samples into and out of the sample chamber. It is also possible to inoculate the fluid samples within the sample chamber.

As may be used herein, the terms bottom, lower, below and the like are descriptive of a feature that is located towards a first end/side of an apparatus, system or component while the terms top, upper, above and the like are descriptive of a feature that is located towards a second, opposing end/side of the apparatus, system or component. Such an apparatus, system or component may be inverted without altering the scope of protection which, as below, is defined by the appended claims.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An apparatus for obtaining samples from a process, the apparatus comprising a sample chamber comprising at least one inlet and at least one outlet, a dam positioned in the chamber between the at least one inlet and the at least one outlet, and a gate moveable within the chamber between a first position and a second position to eject a first sample from the chamber via the at least one outlet and simultaneously draw a second sample into the chamber via the at least one inlet.

2. The apparatus of claim 1, wherein the dam prevents fluid communication between the at least one inlet and the at least one outlet.

3. The apparatus of claim 1, wherein the at least one inlet is located proximal a first side of the dam and the at least one outlet is located proximal a second, opposite side of the dam.

4. The apparatus of claim 1, wherein the sample chamber comprises a housing arranged, adapted or otherwise configured for location in the process.

5. The apparatus of claim 4, wherein the at least one inlet comprises a first opening on an outer surface of the housing and a second opening on an inner surface of the housing such that a sample is drawn into the sample chamber directly from the process, and or wherein the at least one outlet comprises a first opening on an outer surface of the housing and a second opening on an inner surface of the housing such that a sample is ejected from the sample chamber directly into the process.

6. The apparatus of claim 1, wherein the first position of the gate is proximal or abutting a first side of the dam and the second position of the gate is proximal or abutting a second, opposite side of the dam.

7. The apparatus of claim 1, wherein the gate is configured to pivot about a longitudinal axis through the chamber.

8. The apparatus of claim 1, wherein the apparatus further comprises at least one sensor to enable a measurement to be performed within the sample chamber.

9. The apparatus of claim 8, wherein at least one sensor is located on one or both faces of the gate, and or on the dam.

10. The apparatus of claim 8, wherein the at least one sensor is selected from the group comprising oxygen sensors, temperature sensors, chemical sensors, pH sensors, sludge settlement sensors, suspended solids sensors, turbidity sensors, density sensors, conductivity sensors, salinity sensors and contact sensors.

11. The apparatus of claim 1, wherein the apparatus further comprises means, such as one or more pumps which may be located on or in the dam, to agitate a sample within the sample chamber.

12. The apparatus of claim 1, wherein the gate is moveable between the second position and the first position to eject a sample from the chamber via the at least one inlet and simultaneously draw another sample into the chamber via the at least one outlet.

13. The apparatus of claim 1, wherein reciprocation of the gate between the first position and the second position causes a plurality of samples to be drawn into the chamber and subsequently ejected.

14. The apparatus of claim 1, wherein the apparatus comprises a plurality of inlets and a plurality of outlets, wherein the plurality of inlets and outlets are distributed vertically in the sample chamber.

15. The apparatus of claim 1, wherein the gate comprises one or more wipers to provide a seal between the gate and the inner surface of the sample chamber and to assist in drawing samples into the sample chamber and/or ejecting samples from the sample chamber.

16. The apparatus of claim 1, wherein the sample chamber is substantially cylindrical and or wherein a lower portion of the sample chamber is substantially frusto-conical.

17. The apparatus of claim 1, wherein the gate and or the dam is hollow, and wherein internal volumes of the gate and or the dam may house one or more sensors, micro-pumps and/or conduits for the delivery of inoculant to the sample chamber.

18. The apparatus of claim 1, wherein the apparatus is, at least in part, hermetically sealed.

19. The apparatus of claim 1, wherein the apparatus comprises communications means such as one or more conduits for connection to a controller, Wi-Fi, Bluetooth, or NFC.

20. The apparatus of claim 1, wherein the apparatus comprises a mounting post of a predetermined length corresponding to a desired depth to which the apparatus is to be inserted in the process, wherein the mounting post may be hollow so as to accommodate one or more conduits.

* * * * *